(12) United States Patent
Klimes et al.

(10) Patent No.: US 8,209,977 B2
(45) Date of Patent: Jul. 3, 2012

(54) FAST-FILL TANDEM MASTER CYLINDER

(75) Inventors: Milan Klimes, Niles, MI (US); Timothy J. Albert, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/832,524

(22) Filed: Jul. 8, 2010
(Under 37 CFR 1.47)

(65) Prior Publication Data
US 2012/0006017 A1   Jan. 12, 2012

(51) Int. Cl.
*B60T 11/224* (2006.01)
*F16B 7/04* (2006.01)

(52) U.S. Cl. ........................................... 60/577
(58) Field of Classification Search .............. 60/562, 60/576, 577
See application file for complete search history.

(56) References Cited

U.S. PATENT DOCUMENTS

| | | | |
|---|---|---|---|
| 3,946,563 A * | 3/1976 | Rivetti et al. ............ | 60/562 |
| 4,086,770 A | 5/1978 | Shaw | |
| 4,155,223 A * | 5/1979 | Falk ........................ | 60/577 |
| 4,170,386 A | 10/1979 | Shutt | |
| 4,191,020 A * | 3/1980 | Krohn et al. ............. | 60/577 |
| 4,254,624 A | 3/1981 | Gaiser | |
| 4,499,729 A | 2/1985 | Gaiser | |
| 4,559,781 A | 12/1985 | Steer et al. | |
| 5,359,854 A * | 11/1994 | Wagner et al. .......... | 60/577 |
| 5,720,170 A * | 2/1998 | Hageman et al. ....... | 60/576 |
| RE40,573 E | 11/2008 | Ogiwara et al. | |
| 2004/0065084 A1 | 4/2004 | Coleman et al. | |

FOREIGN PATENT DOCUMENTS

| DE | 10164319 A1 | 7/2003 |
|---|---|---|
| EP | 2085278 A1 | 8/2009 |

OTHER PUBLICATIONS

European Search Report in corresponding European patent application (i.e., EP11173014), completed Nov. 3, 2011 (5 pages).
Abstract for DE 101 64 319 A1.
Abstract for EP 2 085 278 A1.

* cited by examiner

*Primary Examiner* — Daniel Lopez
(74) *Attorney, Agent, or Firm* — Maginot, Moore & Beck

(57) ABSTRACT

A fast-fill braking system in one embodiment includes a master cylinder, a first chamber within the master cylinder, a second chamber within the master cylinder located forward of the first chamber, a fast-fill piston within the first chamber, a primary piston within the first chamber and movable with respect to the fast-fill piston, and a secondary piston within the second chamber.

14 Claims, 5 Drawing Sheets

FAST-FILL TANDEM MASTER CYLINDER

FIELD

The invention relates to braking systems, and in particular to a fast-fill master cylinder.

BACKGROUND

A braking system typically includes a master cylinder which is fluidly coupled to downstream braking circuits. During an initial period of actuation, the master cylinder generates fluid pressure in downstream braking circuits and displaces fluid in order to place friction members of the braking system, e.g., brake pads, against complementary surfaces, e.g., a rotor or a drum. In certain circumstances, brake pads may be displaced away from the rotor, thereby generating a gap between the brake pads and the rotor. Thus, when actuation is first initiated the brake pads are not in physical contact with the rotor of the wheel.

This lack of physical contact between a brake pad and a rotor precludes any physical braking until the brake pads are repositioned into contact with the wheel rotors. Moreover, since there is no significant resistance in the system, there is only minimal pressure buildup in the downstream braking circuits. Consequently, in addition to the lack of braking, an operator of the vehicle may receive a different pedal feedback when braking is first initiated as compared to the pedal feedback the operator receives once the brake pads are in contact with the rotor. This difference in the pedal feedback can be unsettling to the operator.

One way to shorten the lack of braking and reduce the unsettling difference in the pedal feedback when the actuation is first initiated is to displace a larger quantity of fluid within the braking system in order to quickly take up the gap, described above. Such systems are typically referred to as a "fast-fill" braking systems. In order to transfer the larger quantity of fluid, the braking system may include an actuating piston in the master cylinder with a larger diameter as compared to an actuating piston in a braking system which is not designed to provide the desired fast-fill function. A larger diameter piston moves a larger volume of fluid, thereby quickly filling the downstream braking circuits.

A larger piston, however, requires a larger force to move. While during the initial period of actuation the force required to move the larger piston is relatively low, after the initial period of actuation a larger force is required to move the piston than is needed in a system with nominally sized piston. This additional force necessitates a larger boost system.

Therefore, it is highly desirable to provide a master cylinder construction which can minimize the lack of braking and reduce the unsettling difference in the pedal feedback when the actuation is first initiated by rapidly increasing pressure in the downstream braking circuits, and without the need to use a larger boost system.

SUMMARY

According to one embodiment of the present disclosure, there is provided a fast-fill braking system which includes a master cylinder, a first chamber within the master cylinder, a second chamber within the master cylinder located forward of the first chamber, a fast-fill piston within the first chamber and movable with respect to the fast-fill piston, and a secondary piston within the second chamber.

According to another embodiment a fast-fill braking system includes a master cylinder, a first chamber within the master cylinder, a second chamber within the master cylinder located forward of the first chamber, a fast-fill piston within the first chamber, a primary piston slidably received within a cavity in the fast-fill piston, and a secondary piston within the second chamber.

DESCRIPTION

Figure 1:
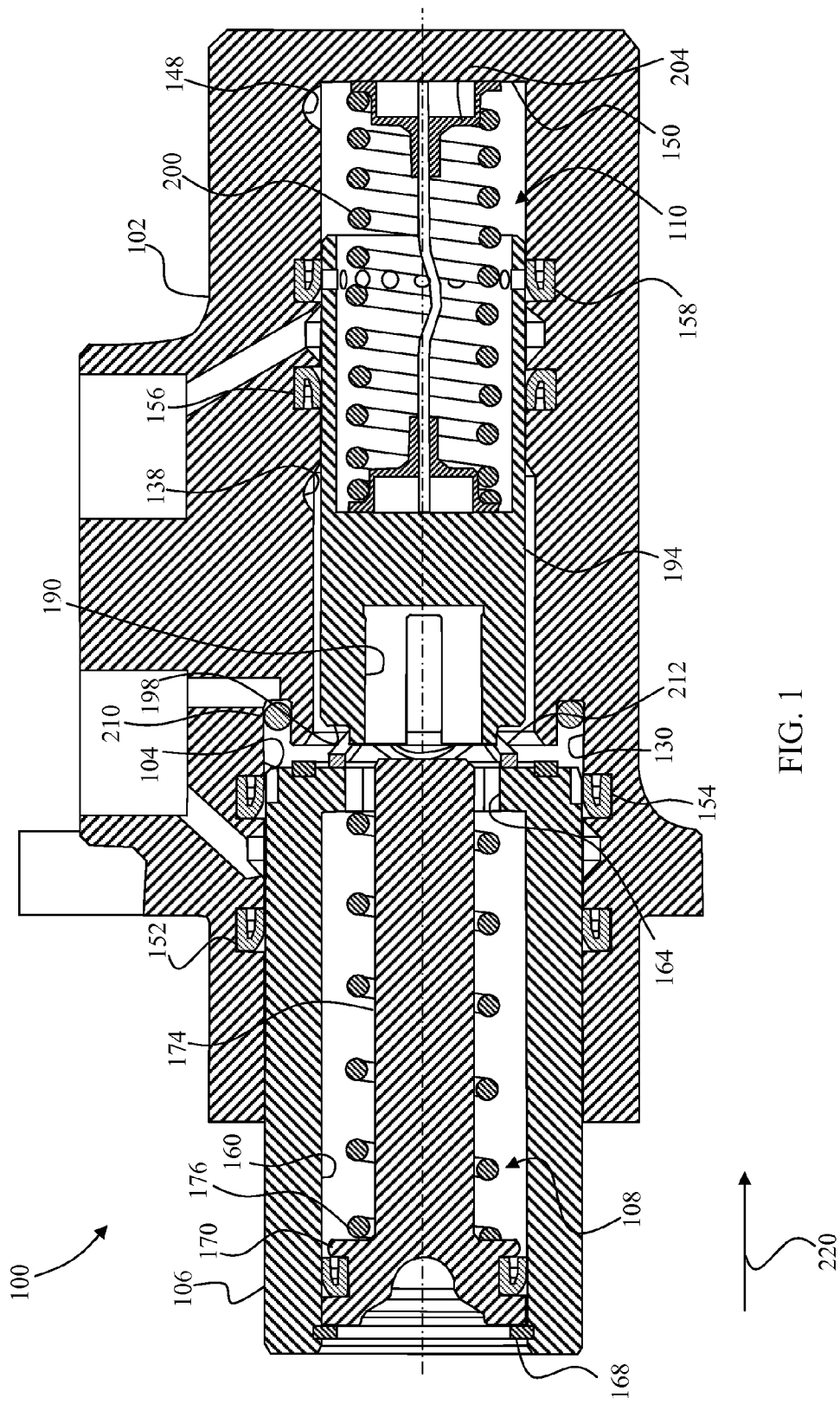
FIG. 1 depicts a partial cross sectional view of a tandem braking system including a primary piston assembly located within a cavity of a fast-fill piston, and a secondary piston assembly.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a partial cross sectional view of a tandem braking system 100 is depicted. The braking system 100 includes a master cylinder 102 which includes a bore 104. A fast-fill piston 106, a primary piston assembly 108, and a secondary piston assembly 110 are located at least partially within the bore 104.

Figure 2:
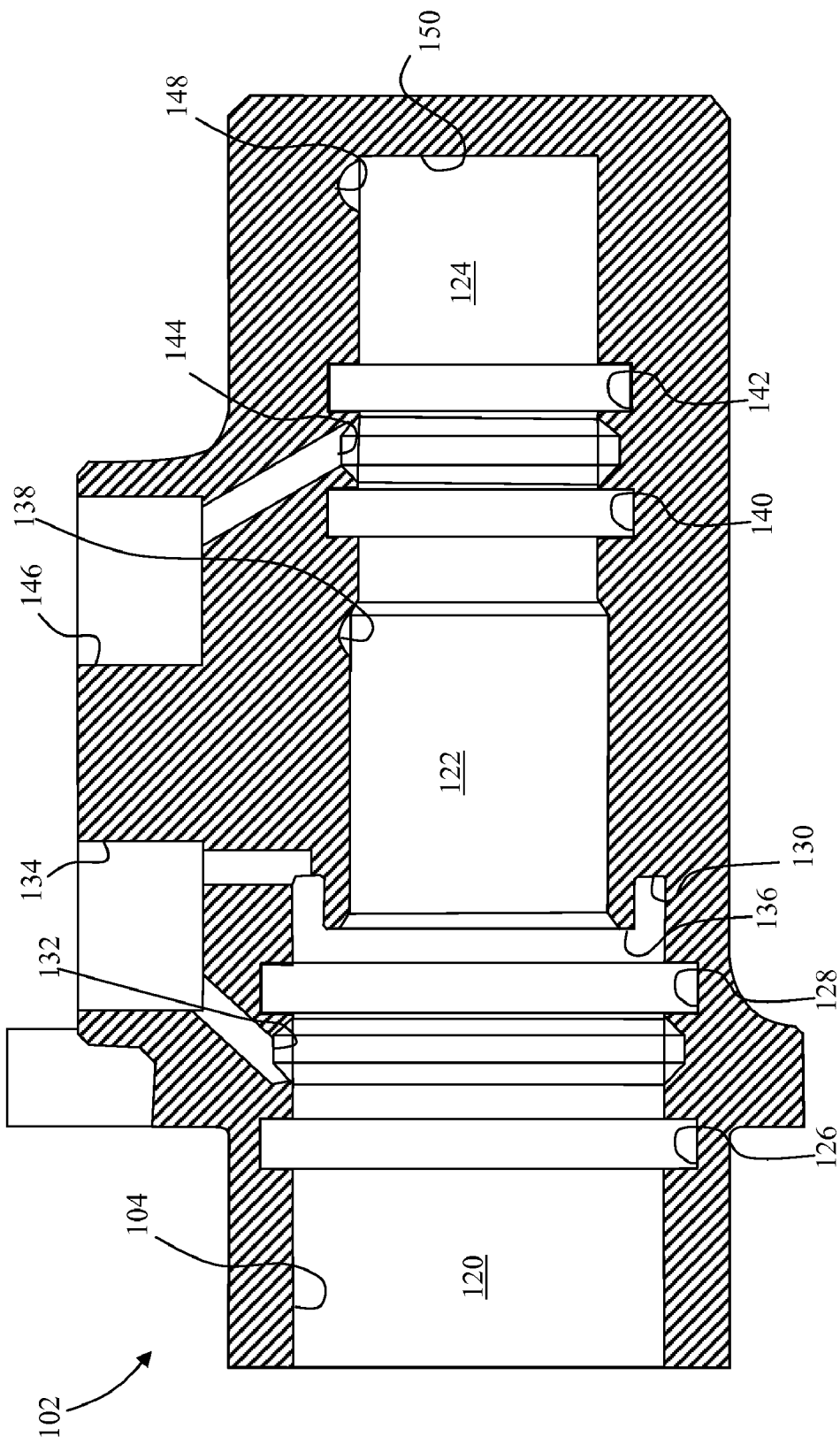
FIG. 2 depicts a cross sectional view of the master cylinder of the braking system of FIG. 1.

With reference to FIG. 2, the bore 104 includes a large diameter portion 120, a medium diameter portion 122, and a small diameter portion 124. Seal wells 126 and 128 are located within the large diameter portion 120 and an O-ring well 130 is located at a forward end of the large diameter portion 120. A vent chamber 132 located between the seal wells 126 and 128 is in fluid communication with a vent port 134 which further vents the O-ring well 130.

The large diameter portion 120 is separated from the medium diameter portion 122 by a sealing lip 136. A primary chamber outlet 138 is located at a forward portion of the medium diameter portion 122. Seal wells 140 and 142 are located within the small diameter portion 124 and a vent chamber 144 located between the seal wells 140 and 142 is in fluid communication with a vent port 146. A secondary chamber outlet 148 is located near a forward wall portion 150 of the medium diameter portion 122.

Figure 3:
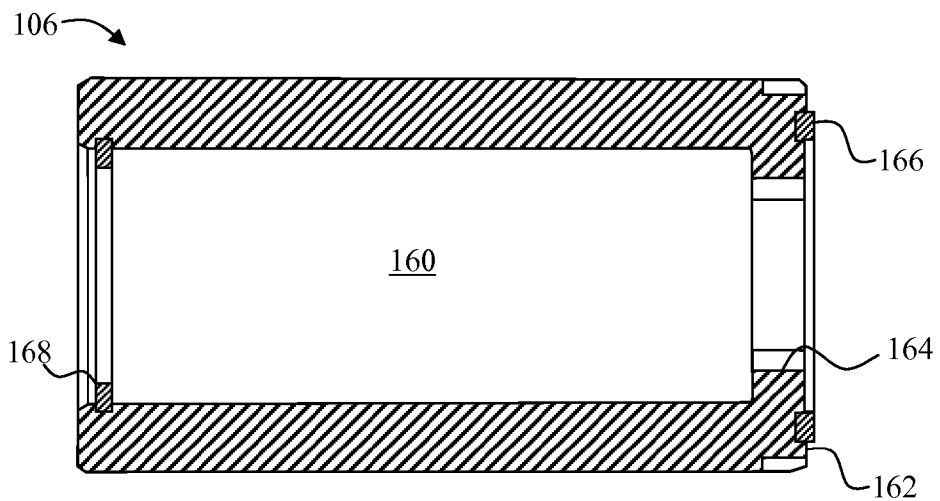
FIG. 3 depicts a cross sectional view of the fast-fill piston of FIG. 1.

The seal wells 126, 128, 140, and 142 receive seals 152, 154, 156, and 158, respectively (see FIG. 1). The seals 152 and 154 sealingly engage the fast-fill piston 106 which is also shown in FIG. 3. The fast-fill piston 106 includes an inner chamber or cavity 160 which opens to a forward facing end portion 162 through an opening 164. A cut-off seal 166 is located at the forward facing end portion 162. The cut-off seal 166 is sized complementary to the sealing lip 136 (see FIG. 2). The cut-off seal 166 thus has an outer diameter that is larger than the diameter of the medium diameter portion 122 of the bore 104 and smaller than the diameter of both the fast-fill piston 106 and the large diameter portion 120 of the bore 104. A lock ring 168 is located at the end of the inner chamber 160 opposite to the opening 164.

Figure 4:
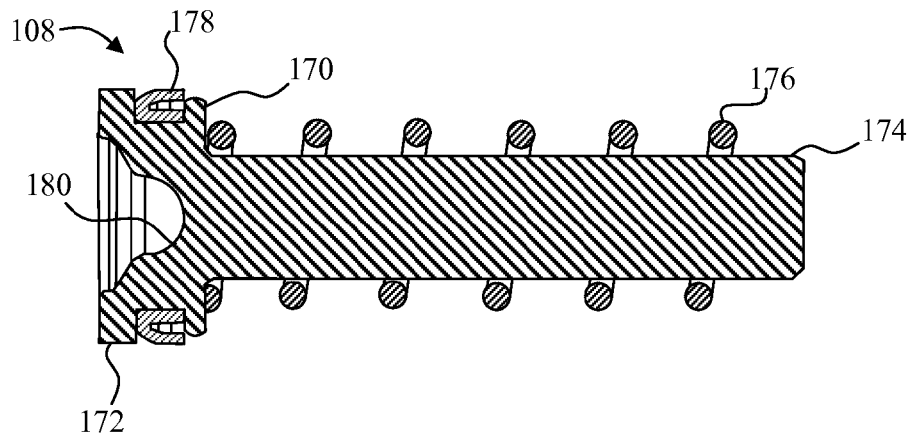
FIG. 4 depicts a cross sectional view of the primary piston assembly of FIG. 1.

The inner chamber 160 is sized to slidingly receive the primary piston assembly 108 which is depicted in FIG. 4. The primary piston assembly 108 includes a primary piston 170 with a body portion 172 and a forward portion 174. A primary spring 176 is located about the forward portion 174. The body portion 172 is sized slightly smaller than the diameter of the inner chamber 160 and larger than the inner diameter of the lock ring 168. A seal 178 mounted in the body portion 172 provides a sealing engagement with the wall of the inner chamber 160 and a cavity 180 is configured to be operatively connected with a brake pedal (not shown).

Figure 5:
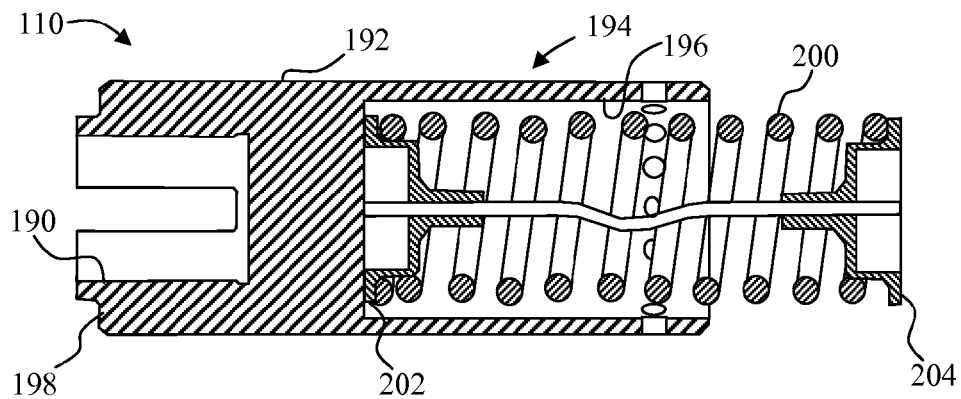
FIG. 5 depicts a cross sectional view of the secondary piston assembly of FIG. 1.

The forward portion 174 of the primary piston 170 is sized to pass through the opening 164 of the fast-fill piston 106 (see FIG. 3) and to be received within a rearward facing cavity 190 of the secondary piston assembly 110 which is shown in FIG. 5. The rearward facing cavity 190 is defined by a body 192 of a secondary piston 194. The secondary piston 194 further defines a forward facing cavity 196 and a spring step 198. A secondary spring 200 is positioned at least partially within the forward facing cavity 196 and extends between a base flange 202 and a base flange 204. The base flange 202 is affixed to the body 192 of the secondary piston 194 while the flange 204 is affixed to the forward wall portion 150 as seen in FIG. 1.

When the braking system 100 is assembled and in a rest position as depicted in FIG. 1, the secondary spring 200 biases the secondary piston 194 to a location spaced apart from the front wall portion 150 of the master cylinder 102 with the opening of the rearward facing cavity 190 proximate the rear of the medium diameter portion 122 of the bore 104 (see also FIG. 2). Seal 156 located within the seal well 140 sealingly engages the secondary piston 194 and defines a forward end of a primary chamber while seal 158 located within the seal well 142 sealingly engages the secondary piston 194 and defines a rear end of a secondary chamber.

An O-ring 210 is positioned within the O-ring well 130 and a fast-fill spring 212 mounted on the spring step 198 biases the fast-fill piston 106 to a location within the large diameter portion 120 that is spaced apart from the sealing lip 136. The primary spring 176 biases the primary piston 170 rearwardly to a location abutting the lock ring 168. The primary piston 170 and the fast-fill piston 106 are coaxial with the forward portion 174 of the primary piston 170 aligned with the opening 164 in the fast-fill piston 106 and the rearward facing cavity 190 of the secondary piston.

Upon initial application of a force on the primary piston 170 in the direction of the arrow 220 of FIG. 1, force is transferred from the primary piston 170 through the primary spring 176 to the fast-fill piston 106. The fast-fill piston 106 in turn passes the applied force to the fast-fill spring 210 which presses against the spring step 198 causing the secondary piston 194 to place a compressive force on the secondary spring 200. The spring constant of fast-fill spring 212 is selected to be greater than the spring constant of the secondary spring 200 and less than the primary spring 176. Accordingly, the secondary spring 200 begins to compress, allowing the secondary piston 194 to move forward toward the forward wall portion 150. Movement of the secondary piston 194 forces fluid out of the secondary chamber outlet 148 and into downstream braking circuits (not shown). As the secondary piston 194 moves forward, the fast-fill piston 106 and the primary piston 170 move forward as a unit.

Movement of the fast-fill piston 106 and the primary piston 170 displaces a large amount of fluid from the large diameter portion 120 into the medium diameter portion 122 and out of the primary chamber outlet 138. The large amount of fluid is located within a fast-fill chamber defined by the seals 178, 154, and 156. The large flow of fluid rapidly fills the downstream braking circuits (not shown) in fluid communication with the primary chamber outlet 138. Forward movement of the fast-fill piston 106, the primary piston 170, and the secondary piston 194 continues until completion of a fast-fill stroke at which time the braking system 100 has moved from the configuration of FIG. 1 to the configuration of FIG. 6.

Figure 6:
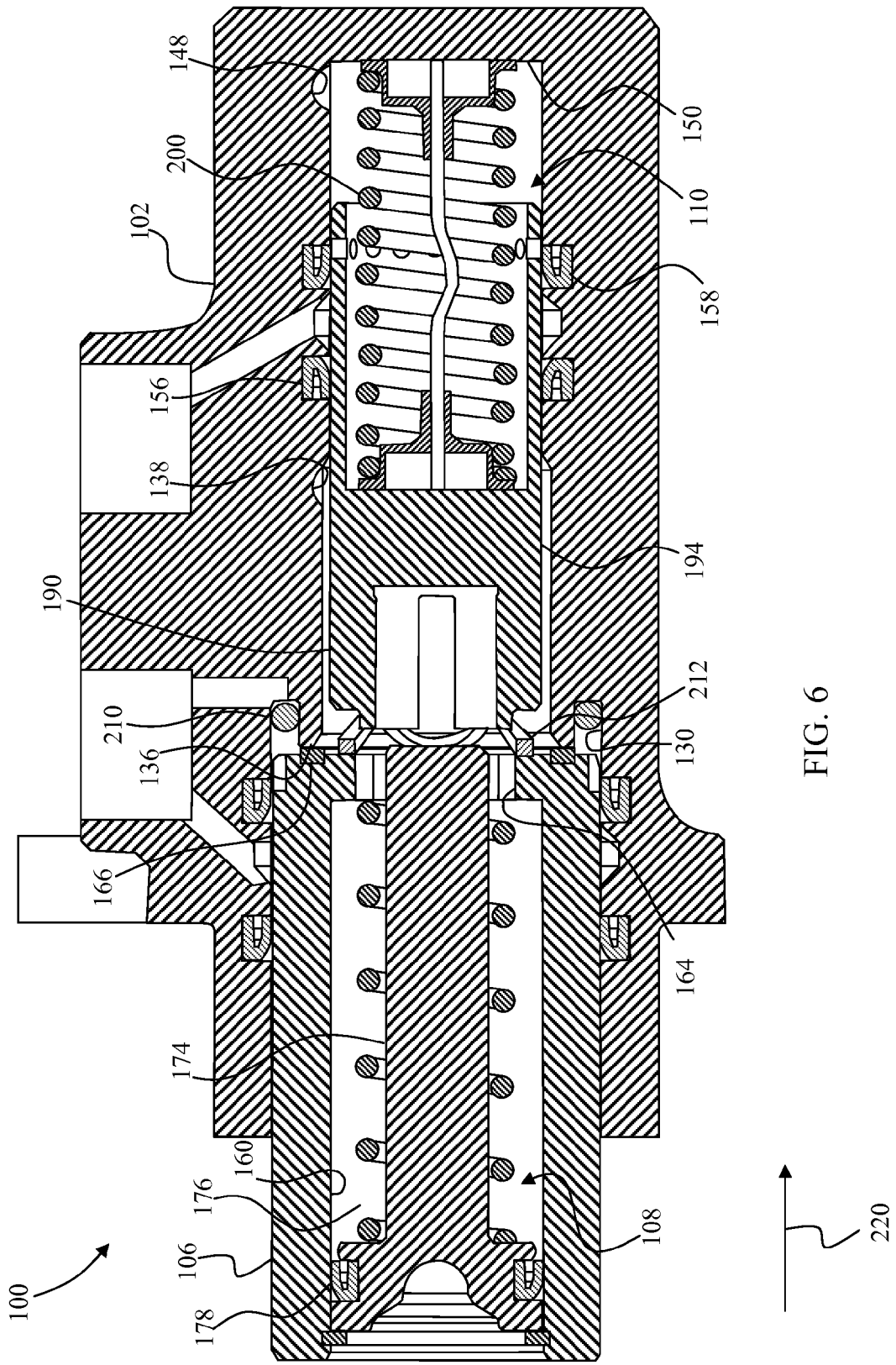
FIG. 6 depicts a partial cross sectional view of the braking system depicted in FIG. 1 after a fast-fill stroke.

In FIG. 6, the fast-fill piston 106, the primary piston 170, and the secondary piston 194 have moved closer to the forward wall portion 150 as compared to the rest configuration of FIG. 1. Additionally, the cut-off seal 166 has been moved into contact with the sealing lip 136. The seal 178 thus defines a rear portion of a primary chamber which includes a portion of the inner chamber 160 and the medium diameter portion of the bore 104 up to the seal 156 while the cut-off seal 166 defines an outer portion of the primary chamber.

Moreover, further movement of the fast-fill piston 106 in the direction of the arrow 220 is precluded by the contact between the cut-off seal 166 and the sealing lip 136. Consequently, continued application of a force on the primary piston 170 in the direction of the arrow 220 of FIG. 6 results in compression of the primary spring 176 and movement of the primary piston 170 toward the forward wall portion 150 thereby increasing the pressure within the primary chamber between the seal 178 and the seal 156.

The increased pressure within the primary chamber is transferred to the secondary piston 194 to place further compressive force on the secondary spring 200. Consequently, the secondary spring 200 is compressed as pressure within the secondary chamber, which extends from the seal 150 to the forward wall portion 150, increases. Forward movement of the primary piston 170 and the secondary piston 194 continues until completion of a full stroke at which time the braking system 100 has moved from the configuration of FIG. 6 to the configuration of FIG. 7.

Figure 7:
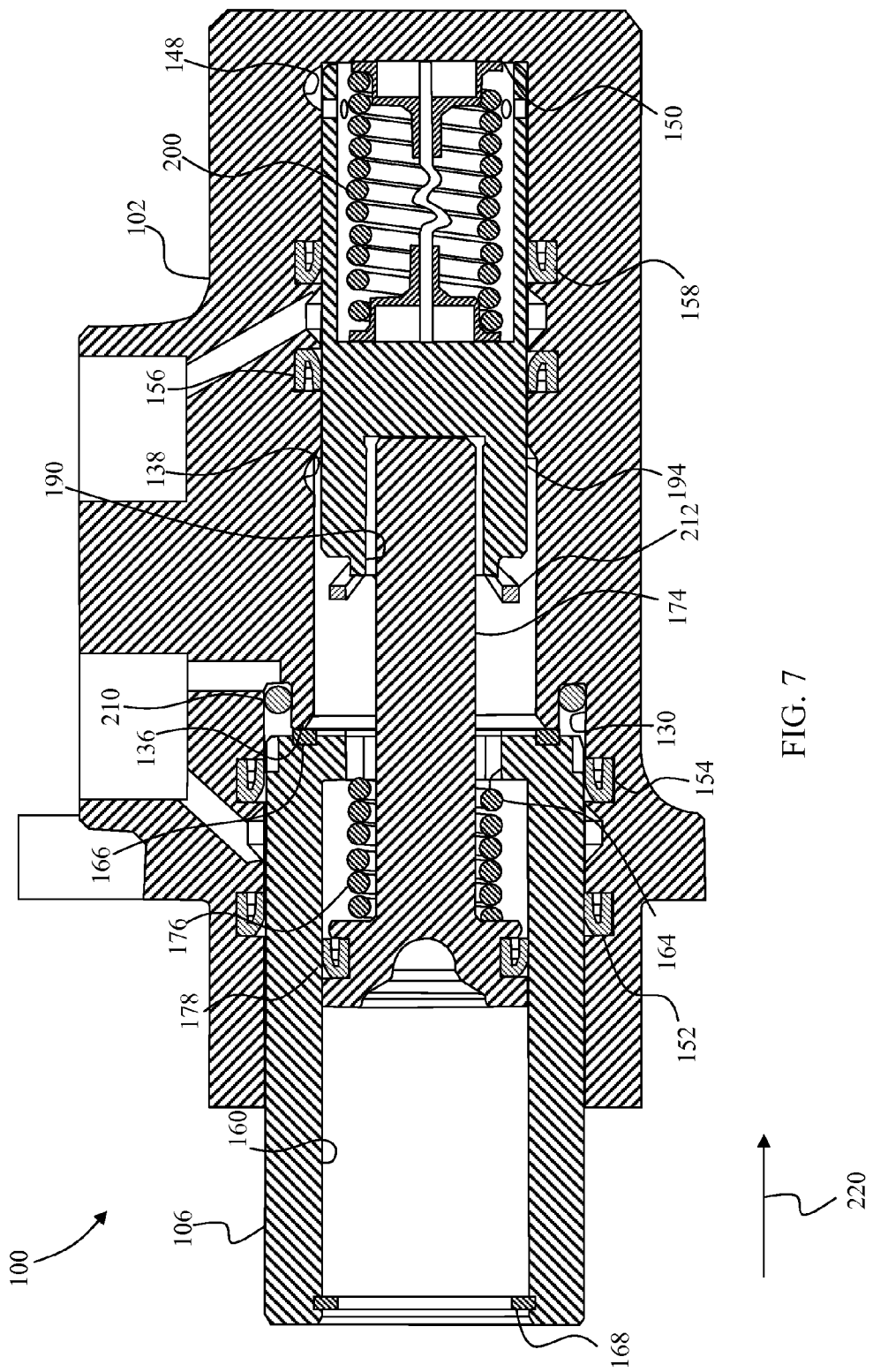
FIG. 7 depicts a partial cross sectional view of the braking system depicted in FIG. 1 after a full stroke.

In FIG. 7, the secondary piston 194 is adjacent to the forward wall portion 150 with the secondary spring 200 fully compressed. Additionally, the forward portion 174 of the primary piston has moved through the bore 164 and into the rearward facing cavity 190 as compared with the configuration of FIG. 6 and the primary spring 176 is fully compressed. The full stroke condition of FIG. 7 thus provides a high pressure in both the primary and the secondary chambers.

When pressure in the direction of the arrow 220 is removed from the primary piston 174, the foregoing description is substantially reversed. Thus, the primary spring 176 acts against the primary piston 174 to move the primary piston 174 away from the forward wall portion 150. Movement of the primary piston 174 away from the forward wall portion 150 reduces the pressure in the primary chamber (between the seals 130, 178 and 156) allowing the secondary spring 200 to decompress. As the secondary spring 200 decompresses, the secondary piston 194 is biased away from the forward wall portion 150 reducing the pressure in the secondary chamber (between the seal 158 and the forward wall portion 150).

The rearward movement of the primary piston 174 and the secondary piston 194 continues until the braking system 100 is in the condition depicted in FIG. 6. From the condition of FIG. 6, the absence of a force applied to the primary piston 174 allows the primary spring 176 to decompress until rearward movement of the primary piston 174 is arrested by the lock spring 168. The resulting reduction in pressure in the primary chamber (between the seals 130, 178 and 156) allows the secondary spring 200 to decompress thereby forcing the fast-fill spring 212 against the fast-fill piston 106. The spring 200 and the fast-fill spring 212 thus bias the fast-fill piston 106 away from the forward wall portion 150 until the braking system 100 arrives at the condition depicted in FIG. 1.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A fast-fill braking system comprising:
a master cylinder;
a bore structure including a first wall portion that defines a first chamber within the master cylinder having a first diameter and a second wall portion that defines a second chamber within the master cylinder located forward of the first chamber having a second diameter that is smaller than the first diameter;
a fast-fill piston slidably received within the first chamber and is configured to move with respect to the first chamber between a rearward position and a forward position, the fast-fill piston including an inner wall portion that defines an interior chamber and a front wall portion that defines a front opening into the interior chamber;
a primary piston slidably received within the interior chamber and configured to move with respect to the fast-fill piston between a retracted position and an extended position when the fast-fill piston is in the forward position; and
a secondary piston slidably received within the second chamber,
wherein the first wall portion and the second wall portion define a sealing lip therebetween;
wherein the fast-fill piston and the primary piston are each spaced apart from the second wall portion and the sealing lip when the fast-fill piston is in the rearward position; and
wherein the front wall portion of the fast-fill piston is positioned in sealing engagement with the sealing lip when the fast-fill piston is in the forward position such that the interior chamber forms a pressure chamber that leads to the secondary chamber.

2. The system of claim 1, further comprising:
a primary spring located within the inner chamber and configured to bias the primary piston in a rearward direction with respect to the fast-fill piston.

3. The system of claim 2, further comprising:
a fast-fill spring located between the fast-fill piston and the secondary piston and configured to bias the fast-fill piston in the rearward direction with respect to the secondary piston.

4. The system of claim 3, further comprising a secondary spring configured to bias the secondary piston in the rearward direction, wherein:
the primary spring has a first spring constant;
the fast-fill spring has a second spring constant;
the secondary spring has a third spring constant; and
the second spring constant is larger than the third spring constant and smaller than the first spring constant.

5. The system of claim 1, wherein:
the secondary piston includes a rearward facing cavity;
the primary piston is aligned with the rearward facing cavity; and
the primary piston includes a forward portion sized to fit within the rearward facing cavity.

6. The system of claim 1, wherein the primary piston includes a body portion and a forward portion,
wherein the body portion is sealingly engaged with the inner wall portion of the fast-fill piston,
wherein the forward portion extends forwardly from the body portion in alignment with the front opening, the forward portion having a diameter smaller than a diameter of the interior chamber.

7. The system of claim 6, wherein the body portion of the primary piston is configured to compress fluid in the primary chamber as the primary piston moves from the retracted position to the extended position.

8. The system of claim 7, wherein the forward portion is configured to extend through the front opening in the fast-fill piston into the secondary chamber when the primary piston moves from the retracted position to the extended position.

9. The system of claim 8, wherein the forward portion of the primary piston is spaced apart from the front wall portion and the second wall portion to permit fluid from the interior chamber to be displaced toward the secondary chamber by the body portion of the primary piston as the primary piston moves from the retracted position to the extended position.

10. A fast-fill braking system comprising:
a master cylinder;
a first chamber within the master cylinder;
a second chamber within the master cylinder located forward of the first chamber;
a fast-fill piston within the first chamber;
a primary piston slidably received within a cavity in the fast-fill piston; and
a secondary piston within the second chamber;
a primary spring located within the cavity and configured to bias the primary piston in a rearward direction with respect to the fast-fill piston;
a fast-fill spring located between the fast-fill piston and the secondary piston and configured to bias the fast-fill piston in the rearward direction with respect to the secondary piston;
a secondary spring configured to bias the secondary piston in the rearward direction;
wherein:
the primary spring has a first spring constant;
the fast-fill spring has a second spring constant;
the secondary spring has a third spring constant; and
the second spring constant is larger than the third spring constant and smaller than the first spring constant.

11. The system of claim 10, wherein the fast-fill piston and the primary piston are coaxial.

12. The system of claim 10, wherein:
the secondary piston includes a rearward facing cavity;
the primary piston is aligned with the rearward facing cavity; and
the primary piston includes a forward portion sized to fit within the rearward facing cavity.

13. The system of claim 10, wherein:
the first chamber has a first maximum diameter;
the second chamber has a second maximum diameter; and
the first maximum diameter is larger than the second maximum diameter.

14. The system of claim 13, wherein:
the fast-fill piston includes a forward facing portion;
a seal is positioned on the forward facing portion; and
the seal has an outer diameter that is larger than the second maximum diameter and smaller than the first maximum diameter.

* * * * *